US012791332B2

(12) United States Patent
Kalam et al.

(10) Patent No.: US 12,791,332 B2
(45) Date of Patent: Nov. 10, 2026

(54) ROUTING BASED ON CELL COVERAGE EVALUATION

(71) Applicant: DISH Network Technologies India Private Limited, Bangalore (IN)

(72) Inventors: Arun Pulasseri Kalam, Bangalore (IN); Manasa Jami, Visakhapatnam (IN)

(73) Assignee: DISH Network Technologies India Private Limited, Bangalore (IN)

( * ) Notice: Subject to any disclaimer, the term of this patent is extended or adjusted under 35 U.S.C. 154(b) by 72 days.

(21) Appl. No.: 18/421,608

(22) Filed: Jan. 24, 2024

(65) Prior Publication Data

US 2025/0237514 A1 Jul. 24, 2025

(51) Int. Cl.
*G01C 21/34* (2006.01)

(52) U.S. Cl.
CPC ................................ *G01C 21/3461* (2013.01)

(58) Field of Classification Search
CPC .................................................. G01C 21/3461
See application file for complete search history.

(56) References Cited

U.S. PATENT DOCUMENTS

2014/0336923 A1* 11/2014 Hwang .............. G01C 21/3461 701/410
2019/0331501 A1* 10/2019 Wang ..................... G01C 21/20
2019/0383624 A1* 12/2019 Magzimof .......... G01C 21/3453
2022/0196425 A1* 6/2022 Xu ......................... H04W 24/10
2023/0194274 A1* 6/2023 Song .................. G01C 21/3461 701/420
2023/0362694 A1* 11/2023 Swar ..................... H04W 24/08

OTHER PUBLICATIONS

Fida et al., "Impact of Device Diversity on Crowdsourced Mobile Coverage Maps," Presented at the Proceedings of the 14th International Conference on Network and Service Management, Rome, Latium, Italy, Nov. 5-9, 2018, 5 pages.
Martin et al., "Forecasting Mobile Transmission Reliability Using Crowd-Sourced Cellular Coverage Data," Presented at the Proceedings of the 2014 Systems and Information Engineering Design Symposium (SIEDS), Charlottesville, VA, USA, Apr. 25, 2014, 6 pages.
Molinari et al., "Spatial Interpolation based Cellular Coverage Prediction with Crowdsourced Measurements," Presented at the Proceedings of the 2015 ACM SIGCOMM Workshop on Crowdsourcing and Crowdsharing of Big (Internet) Data, London, England, United Kingdom, Aug. 17-21, 2015, 6 pages.

* cited by examiner

*Primary Examiner* — Khoi H Tran
*Assistant Examiner* — Tristan J Greiner
(74) *Attorney, Agent, or Firm* — Lowenstein Sandler LLP

(57) ABSTRACT

A method is described that includes receiving user-input requesting a route from a first geolocation to a second geolocation. In response to the received user-input, a prediction map comprising predicted signal strengths associated with a wireless network at a plurality of geolocations between the first geolocation and the second geolocation is accessed. The prediction map accounts for expected weather conditions at the plurality of geolocations during an estimated period of travel between the first geolocation and the second geolocation. The route from the first geolocation to the second geolocation can be determined based on the prediction map. The route is determined such that a signal strength along the route during the estimated period of travel is above a first threshold signal value.

20 Claims, 6 Drawing Sheets

ROUTING BASED ON CELL COVERAGE EVALUATION

TECHNICAL FIELD

This specification relates to wireless network signal transmission evaluation and geolocation navigation.

BACKGROUND

A wireless network allows devices to stay connected without being tethered to any wires. Access points amplify network signals, so a device can be far from a router or a cell tower but still be connected to the network. Different networks (e.g., local area networks, cellular radio access networks, cellular core networks, etc.) can have varying levels of coverage in different locations (e.g., outside or inside a building).

SUMMARY

In a general aspect, a method performed by a computing device and in relation to a network environment and a user-device is provided. In some implementations, the method can be executed at the user-device or within the network environment. The method includes receiving user-input requesting a route from a first geolocation to a second geolocation. The method further includes accessing, in response to the user-input, a prediction map comprising predicted signal strengths associated with a wireless network at a plurality of geolocations between the first geolocation and the second geolocation, the prediction map accounting for expected weather conditions at the plurality of geolocations during an estimated period of travel between the first geolocation and the second geolocation. The method further includes determining, based on the prediction map, the route from the first geolocation to the second geolocation, wherein the route is determined such that a signal strength along the route during the estimated period of travel is above a first threshold signal value.

Implementations of the method can include one or more of the following features. The information about the route can be provided to a user-device for presentation on a user-interface of the user-device. The prediction map can be generated based on a prediction model that is trained on training data that includes signal strength corresponding to various geographical locations collected from a plurality of user-devices and corresponding weather conditions. The training data can be collected from the plurality of user-devices over a time period by crowdsourcing signal indicators (e.g., Received Signal Strength Indicator (RSSI), channel state information (CSI), other signal details) of the plurality of user-devices with respective geolocations. In some implementations, the training data can be collected based on tracking the signal indicator.

In some implementations, the generation of the prediction map includes obtaining data representing the expected weather conditions for the plurality of geolocations between the first geolocation and the second geolocation during the estimated period of travel, and executing the prediction model to determine the predicted signal strengths at the plurality of geolocations at estimated time points determined based on an expected period of travel between the first geolocation and each of the respective geolocations.

In some implementations, the method further includes receiving information about one or more parameters likely to affect signal strength along the route during the estimated period of travel. The one or more parameters can include at least one of: weather condition parameters, signal status information, and information indicative of obstacles along the route. Optionally, the method can include determining that the signal strength is predicted to fall below the first threshold signal value for at least a portion of the route based on the received information. The method can further include determining a revised route such that the signal strength remains above the first threshold signal value along the revised route during a revised estimated period of travel between the first geolocation and the second geolocation according to the revised route in response to the determination that the signal strength is to fall below the first threshold signal value.

In some implementations, the method can also include providing information about the route to a user-device for presentation on a user-interface of the user-device. In response to receiving a notification that the user-device has a signal strength below a second signal threshold value, a new route can be determined to the second geolocation. The new route can be determined such that a signal strength along the new route during a revised estimated period of travel is above the first threshold signal value. A geolocation map of an area including the new route can be provided for display at the user-interface of the user-device.

The present disclosure further provides a system for implementing the methods provided herein. The system includes one or more processors and a computer-readable storage medium coupled to the one or more processors, having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Various implementations of the technology described herein may provide one or more of the following advantages.

In some cases, the technology described herein can enable efficient signal strength estimation that can be used in various contexts including navigating users, in an online or an offline context, to assist a user to position themselves in locations that provide sufficiently strong network signal (e.g., during the whole route or as a final destination point) to allow network service execution, supporting network providers to evaluate and improve the network signal strength and identify weak spots in the network coverage, maintaining connectivity while network services are used and have not yet been completed (e.g., during a search execution, during a phone call or a video call, others).

In some cases, when a user's location is associated with low signal strength from a wireless network used by the user's device, the user-device may have limited access to some of the services provided by the user's device that rely on network accessibility. In those cases, the prediction capabilities of the present disclosure can support the user to reposition themselves by navigating them from a location with no or low network signal strength to another location where the network coverage can be expected to be higher and to support the services used by the user's device. For example, a map can be displayed at a user-interface of the user's device that can indicate areas associated with expected signal strength that is sufficient for service execution (e.g., above a threshold level).

In some cases, the user-device can connect to a wireless network to use service provided by an application running on the user-device, for example, service for navigation, for communication, or for tracking, among other examples. While the user-device is connected to the wireless network, the execution of the services can be maintained, and it may not be desirable that those services are interrupted. For example, a network may provide wireless signal for a particular geo-area, however, some portions of the area may experience signal strength decrease due to various factors such as environmental factors (e.g., weather, terrain, dense tree areas, physical obstructions) or network configurations.

In some cases, the predicted network signal strength can be fed into a process of navigating a user in a way that safety and reachability of the user is maintained, for example, by routing the user through locations where the signal strength is above a threshold value and thus the user can be reached or tracked over the network.

In some cases, the prediction of the network signal strength and using such prediction data for further routing can be used in data evaluation cases performed in relation to evaluating the network coverage as a whole and identifying improvements to the network coverage (e.g., determining whether building obstructions are interfering with the signal and adjusting the network hardware to reduce such interference).

The details of one or more implementations of the present disclosure are set forth in the accompanying drawings and the description below. Other features and advantages of the description will become apparent from the following description, and from the claims. Unless otherwise defined, the technical and scientific terms used herein have the same meaning as commonly understood by one of ordinary skill in the art to which this invention belongs.

DETAILED DESCRIPTION

Figure 1:
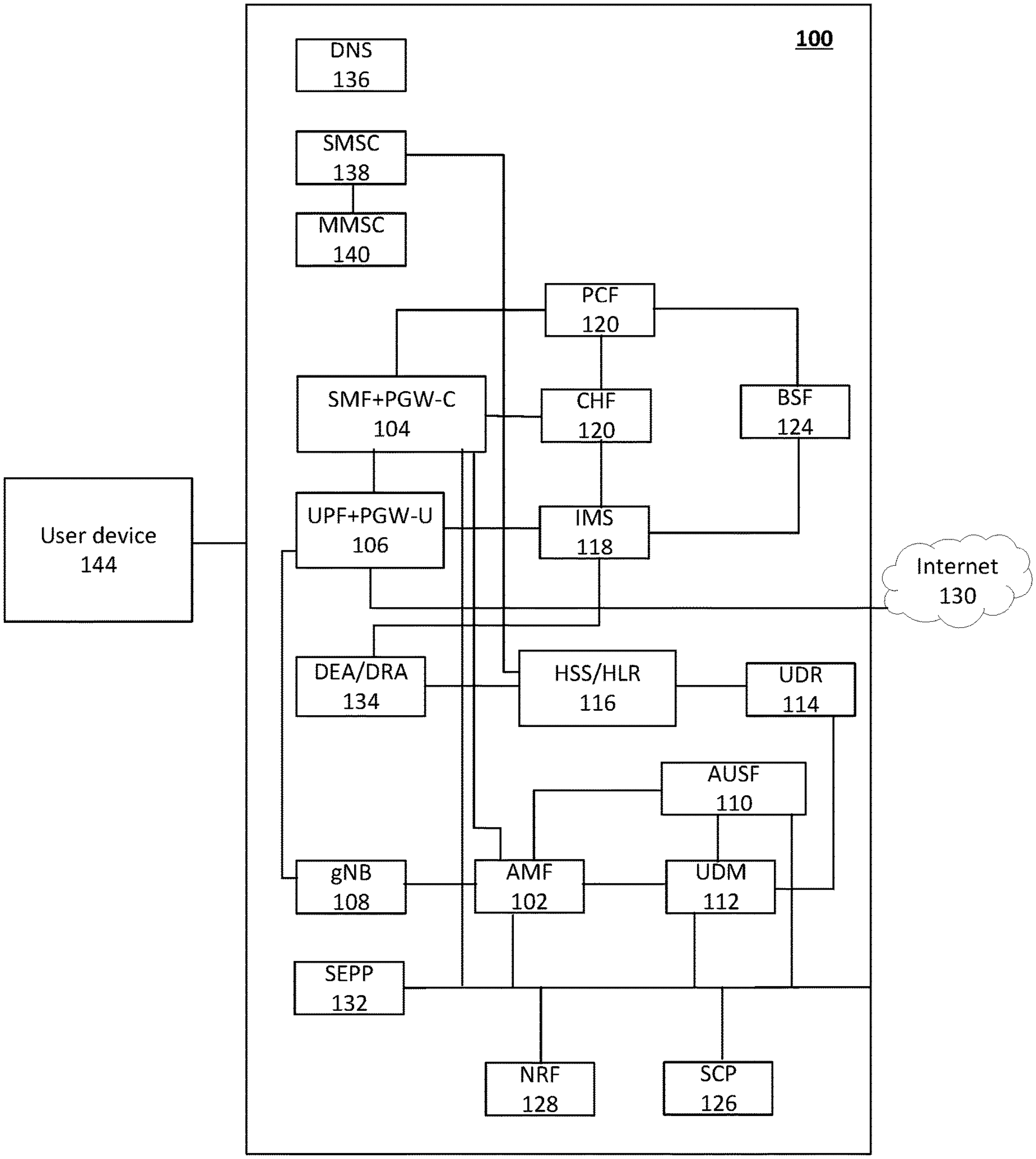
FIG. 1 is a diagram of an example of network environment and a user-device connected to the exemplary network environment.

The technology described herein relates to determining routes based on predictions for signal strength associated with a wireless network at multiple locations within an area, such as between two geolocations. Wireless networks transmit wireless signals that extend over an area of network coverage. The range and strength of a wireless signal can depend on interferences from environmental, network infrastructure factors, or terrain limitations. For example, weather conditions can interfere with the strength of the wireless signal. The wireless coverage can vary depending on environmental conditions and this can limit communication services provided over a wireless network. Thus, signal strength and continuous connectivity of devices to the network can change while devices move between areas with different coverage characteristics. Network interruptions can lead to poor service performance for network services.

In accordance with implementations of the present disclosure, a prediction map can be accessed to determine predicted signal strength associated with a wireless network. The prediction map can include predicted signal strength values for multiple geolocations that are determined when taking into account one or more factors that can affect the signal strength. For example, the predicted signal strength values can be based on environmental factors including one or more of weather conditions (e.g., wind speed, precipitation, cloud coverage, humidity, among other examples), air quality, terrain type, dense trees, and others. Further, the predicted signal strength can be determined based on other factors such as time of the day, period of the year, or network configurations and/or limitations. For example, network coverage and signal strength can be affected by channel overcrowding in areas where multiple networks overlap or by the number of connected devices to the network. Further and for example, network signal strength can be affected by physical or natural obstructions that can exist in indoor spaces (e.g., walls, conductive material) or outdoors (e.g., tunnels, valleys, peaks, etc.).

In some implementations, the prediction of the signal strength can be performed for a period of time that can correspond to an estimated time relevant for providing network services. For example, if a user is using a user-device and relies on the network signal to consume a network service, a prediction for the network signal can be made for a period of time for which the user is expected to use such signal. In some cases, that may be an unlimited period, or in other cases, that can be a period of time for a user to move between two locations, or period of time to execute a requested service (e.g., to perform a network call for a predefined time as set in a meeting request).

In some implementations, the prediction of the signal strength can be accessed for a plurality of locations within a path to reach a respective geolocation from a current geolocation. In some implementations, the prediction can be re-evaluated dynamically based on changing factors affecting the strength of the signal as well as the repositioning of the device that is routed. Based on the accessed predictions, a route that connects two geolocations can be determined so that the signal strength along the route during the estimated period of travel can be above a threshold signal value at which network services can be available for the user-device.

FIG. 1 depicts a diagram of an example of a network environment 100 and a user-device 144 connected to the exemplary network environment. As used herein, a network environment (sometimes referred to herein simply as an environment) refers to a set of multiple devices, modules, and functions that are configured to jointly enable wireless communication. For example, a network environment can include a 5G network that includes a set of multiple devices, radio access network (RAN)/core network functions, and application functions that are configured and integrated to jointly enable wireless communication. An environment, such as the environment 100, can be a portion of a 5G New Radio ("5G-NR" or simply "5G") cellular network environment. Standards for cellular network architectures have previously been described, for example, in 3GPP TS 23.501

(for 5G networks) and 3GPP TS 23.401 (for 4G long-term evolution "LTE" networks) (the entireties of which are hereby incorporated by reference). While FIG. 1 shows an exemplary architecture for a network environment (i.e., environment 100), it is not intended to be limiting. The lines depicted in FIG. 1 that connect network elements are indicative of the possibility of direct communication between those network elements.

Network environment 100 includes a packet core network, which includes an access management function (AMF) 102, a session management function and packet data network gateway-control module (SMF+PGW-C) 104, a user plane function and packet data network gateway-user plane module (UPF+PGW-U) 106, and a policy control function (PCF) 120. The AMF 102 receives all connection and session related information from one or more user-devices 144, and handles connection and mobility management tasks. The AMF 102 forwards all messages related to session management to the SMF+PGW-C module 104. The SMF+PGW-C module 104 and UPF+PGW-U module 106 jointly manage sessions and are configured using Control and User Plane Separation (CUPS). The PCF 120 communicates with the SMF+PGW-C module 104, governing control plane functions via defined policy rules. The UPF+PGW-U module 106 can provide access to the Internet 130 for data applications and the IP Multimedia Subsystem (IMS) core module 118 for voice applications. The IMS core module 118 is a separate application core network from the packet core network and supports voice services, messaging, voice calls, etc.

The environment 100 can further include a charging function (CHF) 122 and a binding support function (BSF) 124. The CHF 122 supports online and offline charging features and completes billing functions. The BSF 124 tracks sessions that are located anywhere in the environment 100, but share common criteria, such as subscriber identifiers. The BSF 124 communicates with the PCF 120 and binds application-function requests to specific PCF implementations, enabling policy scaling of the environment 100.

The environment 100 also includes a gNB 108 (i.e., a 5G base station), which handles RAN-side aspects of the network environment 100 and communicates, either directly or indirectly, with the packet core network elements such as AMF 102, SMF+PGW-C module 104, and UPF+PGW-U module 106.

The environment 100 further includes network elements to manage user or subscriber information. For example, the environment 100 includes an authentication service function (AUSF) 110 for user authentication and a unified data management (UDM) module 112. The user database is stored in a unified data repository (UDR) 114. The UDM 112 communicates with the AMF 102, AUSF 110, and the UDR 114 to provide centralized control of network user data. For interworking with 2G, 3G, and 4G network elements, the environment 100 also includes a Home Subscriber System and Home Location Register (HSS/HLR) module 116, which stores subscriber information, location and SIM details, and authentication keys.

The environment 100 further includes a service communication proxy (SCP) 126 and a network repository function (NRF) 128. In accordance with current 5G standards, network functions are based on HTTP version 2, and use the SCP 126 and NRF 128 to communicate. The NRF 128 is used to discover network functions in the environment 100, and the SCP 126 is used to provide a single point of entry for a cluster of discovered network functions, serving as a central control point in the signaling network core.

The environment 100 further includes a security edge protection proxy (SEPP) 132, a diameter edge agent and diameter routing agent (DEA/DRA) module 134, and a domain name system (DNS) 136. The SEPP 132 is a security proxy through which all signaling traffic across operator networks is expected to transit. The DEA/DRA module 134 manages traffic and congestion of messages routed across the environment 100, routing signaling traffic and performing load balancing, relay, proxy and redirect functions within a carrier or interworking with other carriers. The DNS 136 is a naming database in which internet domain names are located and translated into internet protocol (IP) addresses. The environment 100 further includes a short message service center (SMSC) 138 and a multimedia message service center (MMSC) 140 configured to receive, store, route, and forward SMS messages and MMS messages, respectively.

The user-device 144 can interact with the network environment 100 indirectly through an external system/network or directly with the network environment 100 (e.g., via the gNB 108). In some cases, the user-device 144 can be a subscriber to the network environment 100 (e.g., a subscriber to a service provider of the cellular network). In other cases, the user-device 144 can be a non-subscriber roaming on the network environment 100.

Figure 2:
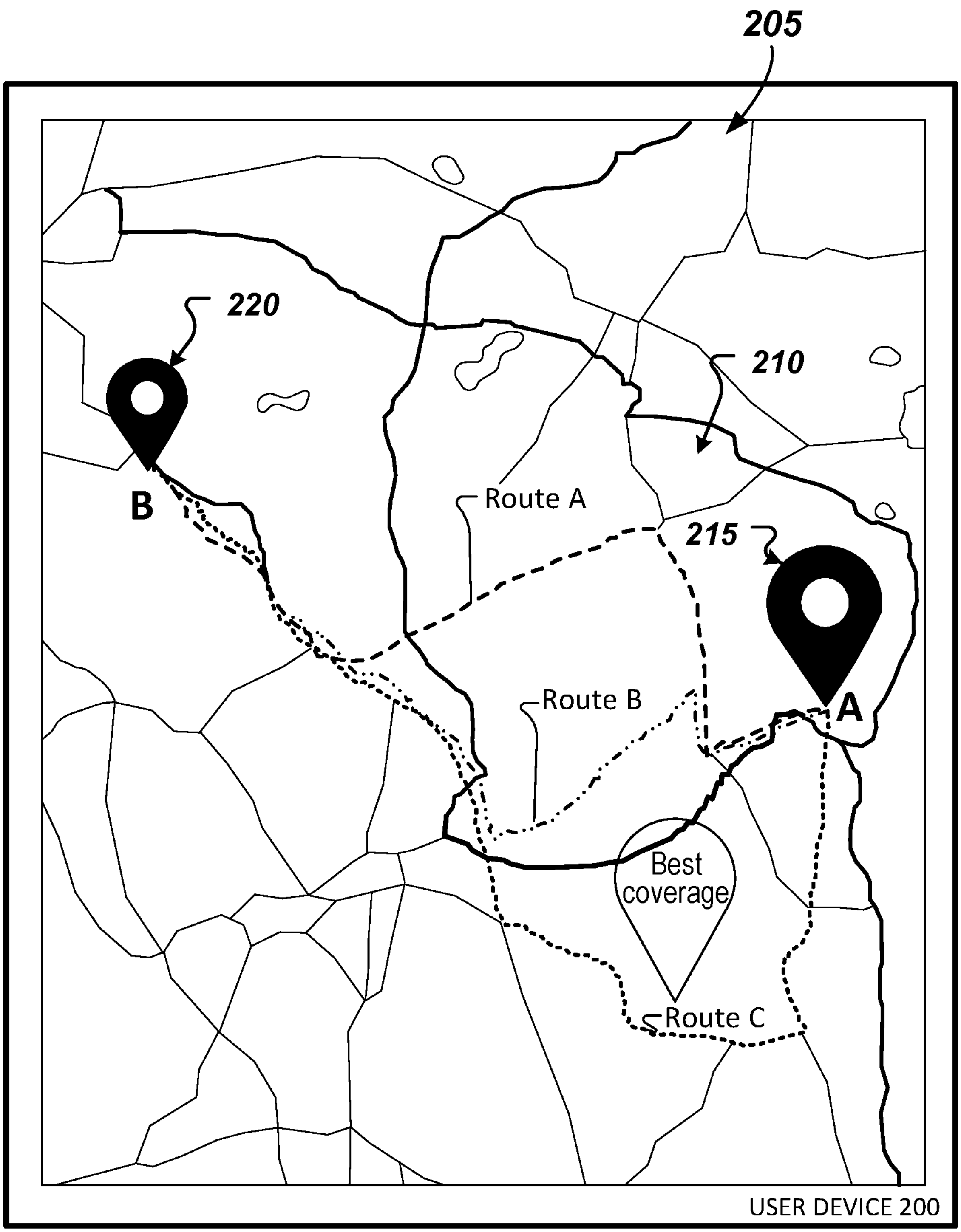
FIG. 2 is a diagram showing an example of routing between a start and a destination point based on predicted signal strength.

FIG. 2 is a diagram of an example routing between a start and a destination point based on predicted signal strength. In some implementations, a user-device 200 can display a user-interface 205 that includes a display of a map. The user-device 200 can be connected to a wireless network, e.g., as discussed in relation to FIG. 1, and can rely on the network signal from the network to execute services such as determining routes, identifying a current location, and navigating between geolocations, among other example services (e.g., communication, web services, other).

The user-interface 205 can be displayed as part of invoking a web service offering navigation services. The user-interface 205 can be configured to provide different views of streets, real-time traffic conditions, and route planning for travelling by one or more of foot, car, bike, air, or other transportation means. The user-interface can provide satellite imagery or street maps, for example in interactive panoramic view.

In some implementations, a route between point A 215 and point B 220 is requested to be determined and displayed on the user-interface 205. The route can be determined by applying techniques for predicting network signal strength so that the route can pass through geolocations that are associated with signal strength that is above a threshold value to maintain the availability of the network provided services.

In some implementations, a user may interact with the user-device 200 and may request to be navigated between point A 215 and point B 220. The selection of the points can be provided through a user-interaction with the map, through typing street names, by referring to GPS coordinates, by referring to a point of interest (e.g., an institution, a space, etc.) among other examples. Based on the input, a prediction map can be accessed. The prediction map can include predicted signal strengths associated with a wireless network at a plurality of geolocations between the first geolocation and the second geolocation. The prediction map can be generated based on a prediction model that can be trained to predict the signal strength when taking into account expected weather conditions at a plurality of geolocations (e.g., between point A 215 and point B 220) during an estimated period of travel between the two geolocations.

In some implementations, multiple routes can be generally available between the two points that can include route A, route B, and route C as presented in FIG. 2. Each of the routes can be associated with an estimated time for travelling between the two points, and the prediction map can be used to evaluate the signal strength along the respective route to determine which one of the routes is associated with a signal strength along the route that is above a predetermined threshold signal value during the estimated period of travel. In some examples, more than one route may match the criterion for the signal strength. In this case, multiple routes can be displayed on the user-interface. In some other examples, none of the routes may match the criteria for the signal strength. In such case, a route that would have the smallest portion (relative in length and/or time with respect to other routes) that would be associated with the signal strength below the threshold can be identified.

In some implementations, during navigating a user according to a provided route, such as route C, the user-device 200 can receive notification(s) for changes in the signal strength along the rest of the path to the target destination, i.e., point B 220. In some instances, a notification can be received that a signal strength associated with geolocations along the path would be associated with predicted signal strength below a second signal threshold value. For example, the predicted signal strength can be a re-evaluated prediction of the signal strength performed based on executing the prediction model used for the prediction map but relying on information about changes in the factors that affect the signal strength. By receiving information about changes in the values of parameters corresponding to factors that affect the signal strength, the prediction based on the prediction model can be updated and new predicted signal strength can be generated. In some instances, a new route can be determined that includes geolocations that are associated with predicted network signal strength that is above the threshold value relied upon for defining the current route (or a different threshold as configured for the navigation request or by default in the user-device 200). In some instances, the new route is determined such that a signal strength along the new route during a revised estimated period of travel is above the threshold signal value and the new route can be provided for display at the user-interface 205 of the user-device 200.

In some implementations, the prediction model used to determine predicted signal strength at multiple geolocations in the context of navigating between point A 215 and point B 220, can be additionally or alternatively executed in the context of determining predicted signal strength for a geo-area, where portions of the area can be annotated according to a scale identifying the level of the signal strength (e.g., for example also annotated in color). Such determination of predicted signal strength can be used when a user relies on a displayed map on the user-device 200 without providing a target destination and for example, based on live tracking of the user-device movement. The user may be guided based on such annotation of the map to travel between locations that are within areas associated with a preferred signal strength.

In some implementations, providing information about the signal strength at one or more locations on a map displayed on a user display of a device can be used to support orientation of a user to a location where he/she can obtain connectivity and for example, perform a phone call, reach out for help, or else. Further, being provided with a route that is optimized according to the signal strength can allow for execution of other services at the device while being navigated. For example, while the user is navigated between point A 215 and point B 220 as described in relation to FIG. 2, the user can use the user-device 200 to use services to perform an audio or video call, to interact with another device, or to maintain other service execution that relies on network connectivity for their successful execution, among other examples.

Figure 3:
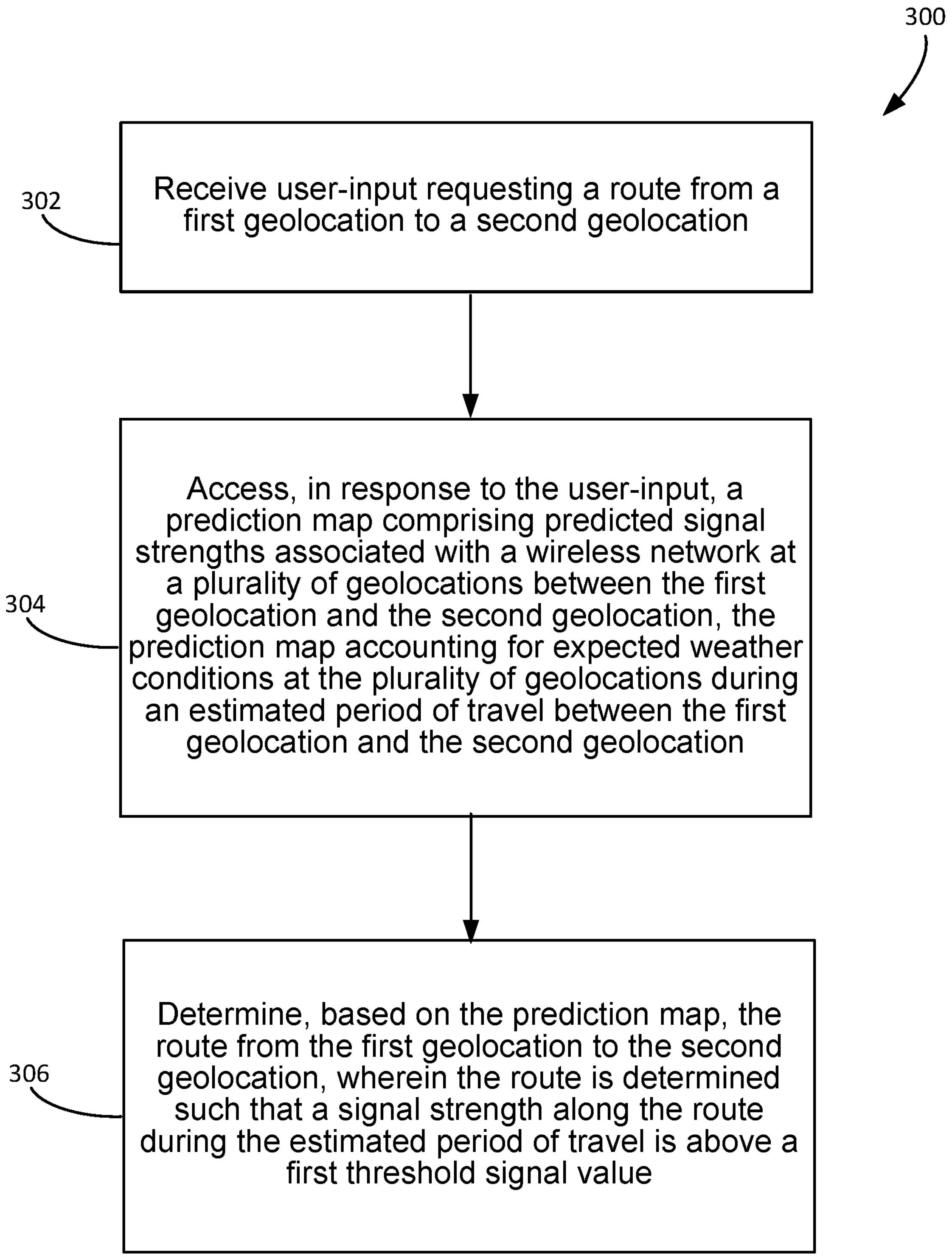
FIG. 3 is a flowchart of an example process for determining a route between geolocations according to predicted signal strength associated with a wireless network.

FIG. 3 is a flowchart of a process 300 for determining a route between geolocations according to predicted signal strength associated with a wireless network. Operations of the process 300 can be executed by a user-device as described in relation to FIG. 1 and/or FIG. 2, by a routing application running on the user-device, a server accessible by the user-device, where the server is communicatively coupled to the user-device and the wireless network, or an application or service hosted at another network (e.g., external network) communicatively coupled to the user-device and the wireless network.

Operations of the process 300 include receiving user-input requesting a route from a first geolocation to a second geolocation (302). For example, a user-device can be subscribed to a service provider that operates the wireless network (e.g., cellular network such as cellular radio access network, cellular core network, or other). In some implementations, the received user-input can be provided through interaction with a user-application installed and/or accessible through the user-device. For example, a user may request to be navigated from the first geolocation to a second geolocation (e.g., a target location or an intermediate stop within a route including multiple connected paths between a sequence of stops).

Operations of the process 300 also include accessing, in response to the user-input, a prediction map comprising predicted signal strengths associated with a wireless network at a plurality of geolocations between the first geolocation and the second geolocation (304). In some implementations, the prediction map accounts for expected weather conditions at the plurality of geolocations during an estimated period of travel between the first geolocation and the second geolocation. In some implementations, the prediction map can additionally or alternatively account for factors that affect the strength of the network signal that can limit the availability of network services (e.g., disrupt phone calls or other audio/video interaction, delay response time (e.g., response to a navigation request, a data accessing request, etc.). For example, different factors affecting signal strength can be considered and used as one or more parameters for predicting the strength of the network signal for a particular period of time. For example, such factors can include environmental conditions (such as weather conditions, air quality, wind speed, humidity), geographical conditions such as route positioning to natural or artificial barriers that can prevent signal waves to reach a device (e.g., passing through a tunnel, within a space that is insulated and/or prevents signal distribution, close to a mountain that may prevent signal from the cell tower to be received, close to conductive material that can affect the network signal, or other).

In some cases, different routes can be associated with different estimated time for travelling, where different factors may have different weight for the signal strength estimation for the different routes (e.g., some routes may be positioned over terrains of different type or in proximity to natural obstructions, while others may or may not be affected by such factors). For example, in case of particular expectation of changes in the weather conditions during the expected time period of travel over a given route, the prediction of the network signal strength can be affected. In that example, another alternative route to the route affected by changes with weather conditions, may or may not be associated with such expectation of weather changes, however, may be associated with expectations of poor air quality or high tree density.

In some implementations, if a user requests to be navigated between point A and point B, a set of routes can be defined. Each route can be associated with an estimation for the signal strength, which can allow a user to determine whether signal strength is expected to reduce availability of network provided services. For example, if a given route is associated with low signal strength, it can be expected that during such a route, a service that relies on network resources may be affected. For example, if the network is a cellular network, moving along a route with low signal strength may be associated with a higher probability for phone call disruptions or disruptions during navigation provided by an application or service that relies on Global Positioning System (GPS) location that can be tracked over the network.

In some implementations, determining an estimation of signal strength over a route from a set of routes determined based on a user-input can take into consideration one or more factors that can affect the strength of the signal during the evaluated time period (to move between A and B). The estimation of the signal strength can be performed for a set of locations over the determined route, where one or all the factors for the strength can be relevant and can be included in the signal strength estimation. In some implementations, the estimated time of arrival at point B can be dynamically re-evaluated during movement along the route. Such reevaluation of the estimated time and considering the prediction for the strength signal (as in the prediction map) can be used for dynamically modifying and/or updating the route navigation to adjust the route to move between locations that are associated with network signal strength that would allow to maintain network services.

Operations of the process 300 further include determining, based on the prediction map, the route from the first geolocation to the second geolocation, wherein the route is determined such that a signal strength along the route during the estimated period of travel is above a first threshold signal value (306).

Optionally, operations of the process 300 can include providing information about the route to a user-device for presentation on a user-interface of the user-device.

Optionally, operations of the process 300 can include determining a new route to the second geolocation in response to receiving a notification that the user-device has a current signal strength (associated with a current geolocation along the route) below a second signal threshold value, for example, as described in relation to FIG. 5. In some implementations, the new route can be determined such that a signal strength along the new route is above the first threshold signal value. In some implementations, the estimation for the signal strength can be performed for geolocation that can be reached within a time period that corresponds to a revised estimated period of travel between the current location of the user-device and the respective geolocation. Optionally, based on the determined new route, a geolocation map of an area including the new route can be provided for display at the user-interface of the user-device. In some implementations, the geolocation map can be presented as described in relation to FIG. 2.

In some implementations, the geolocation map can be a part of a web or native mapping application that can provide real time navigation, traffic, and transit information. In some implementations, the geolocation map can be displayed in the context of executing another service on the user-device that may rely on network signal strength above a threshold value. In cases where the strength is expected to go below the threshold value (e.g., based on an expected route of the user such as a usual route for a user at the time, or based on other implicitly or explicitly provided information about the destination of the user-device), a geolocation map can be displayed to guide the user to follow a particular route. The provided route for guiding may be associated with higher strength of the network signal that can maintain the availability of the network services.

In some instances, the route (or new route) as determined at 306 or later based on a received notification can be provided as input to another application that can be used for monitoring or guiding user's travel, or can be provided to an external service that can aggregate data from multiple devices and consider their distribution over a given territory. In some implementations, the aggregated data can be analyzed and suggestions to user-devices can be provided based on insight determined based on the data. For example, if a user is using a user-device to perform a phone call while traveling in a building of an office towards a meeting room and the route is determined to maintain the connectivity to the network so that the call would not be interrupted, the estimated time of arrival of the user at the meeting room based on the route can be provided as input for the scheduling of the building space and for example to reserving the meeting room for that time. In some implementations, rules for evaluating the data collected from devices and their repositioning can be defined and used in various contexts to support space monitoring, scheduling, routing, notification management, or other.

Figure 4:
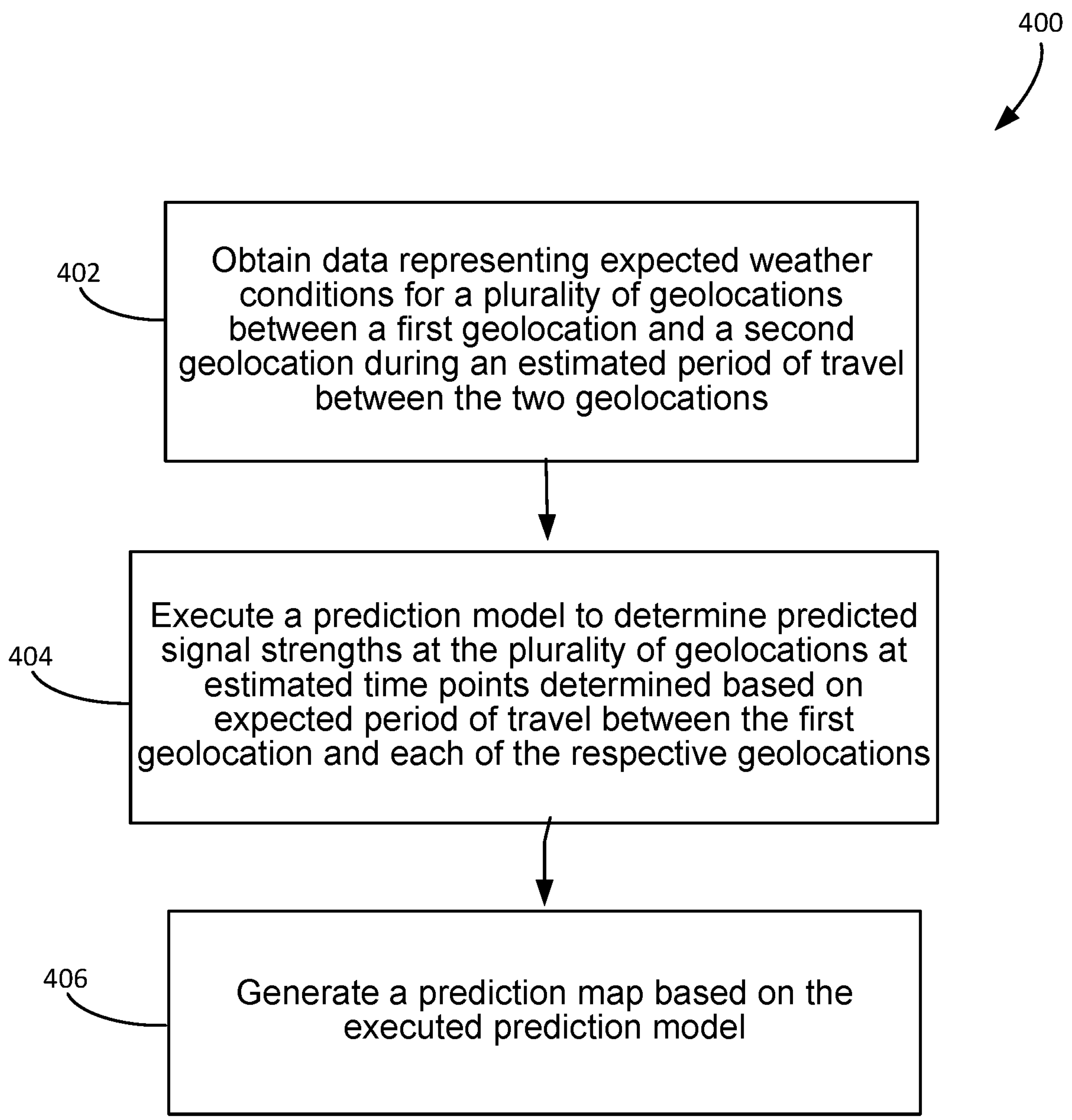
FIG. 4 is a flowchart of an example process for generating a prediction map for predicted signal strength at multiple geolocations for a period of time.

FIG. 4 is a flowchart of a process 400 for generating a prediction map for predicted signal strength at multiple geolocations for a period of time. The operations of the process 400 can be performed based on received input from a user-device that is connected to a wireless network (e.g., personal-area network, a cellular core network associated with the cellular radio access network that a user-device is attempting to connect to, other).

Operations of the process 400 include obtaining data representing expected weather conditions for the plurality of geolocations between the first geolocation and the second geolocation during the estimated period of travel (406). Obtaining the data representing the expected weather conditions for the plurality of geolocations between the first geolocation and the second geolocation during the estimated period of travel can include obtaining data about temperature, air quality, wind, precipitation (e.g., rain, snow) other weather condition that can be associated with affecting the strength of the network signal. Further, factors such as terrain type, physical obstruction (e.g., walls, conductive materials), channel overcrowding, time of the day, among others can be considered by the prediction model, and in those cases data associated with such further factors may also be obtained and used for generating a prediction for the strength of the network signal.

Operations of process 400 further include executing the prediction model to determine the predicted signal strengths at the plurality of geolocations at estimated time points determined based on expected period of travel between the first geolocation and each of the respective geolocations (404).

Operations of process 400 further include generating a prediction map based on the executed prediction model. For example, the prediction map can be the provided for access in response to user-input, as received at operation 302 of FIG. 3.

In some implementations, the prediction model can be trained on training data that includes signal strength corresponding to various geographical locations collected from a plurality of user-devices and corresponding weather conditions (and/or other factors). In some implementations, data from multiple user-devices in connection with the wireless network can be obtained and used for training the prediction model. The data can be associated with various locations within a geographical area (e.g., a city, country, predefined territory, other) so that the trained prediction model can be executed to predict signal strength at an area associated with a request for navigating between locations, for identifying a location associated with sufficient network signal for executing a network service, or other requests.

In some implementations, the execution of the prediction model to generate the prediction map can be performed as an offline or an online process, where the determined prediction values for the signal strength can be used to respond to a request to a device that is connected to the network, or may be in a geolocation that is having disrupted connectivity. In some implementations, the training data can be collected from user-devices connected to the network over a time period by crowdsourcing Received Signal Strength Indicator (RSSI), channel state information (CSI), and/or other signal properties of the plurality of user-devices with respective geolocations. In some implementations, the training data can be collected while tracking devices that are traveling (or repositioning between geolocations) within a particular area covered by the network and over time. The training data can include data obtained from the user-devices related to signal indicators as well as data related to factors considered as affecting the signal strength so that accurate predictions of the signal strength can be generated that takes into account various factors.

Figure 5:
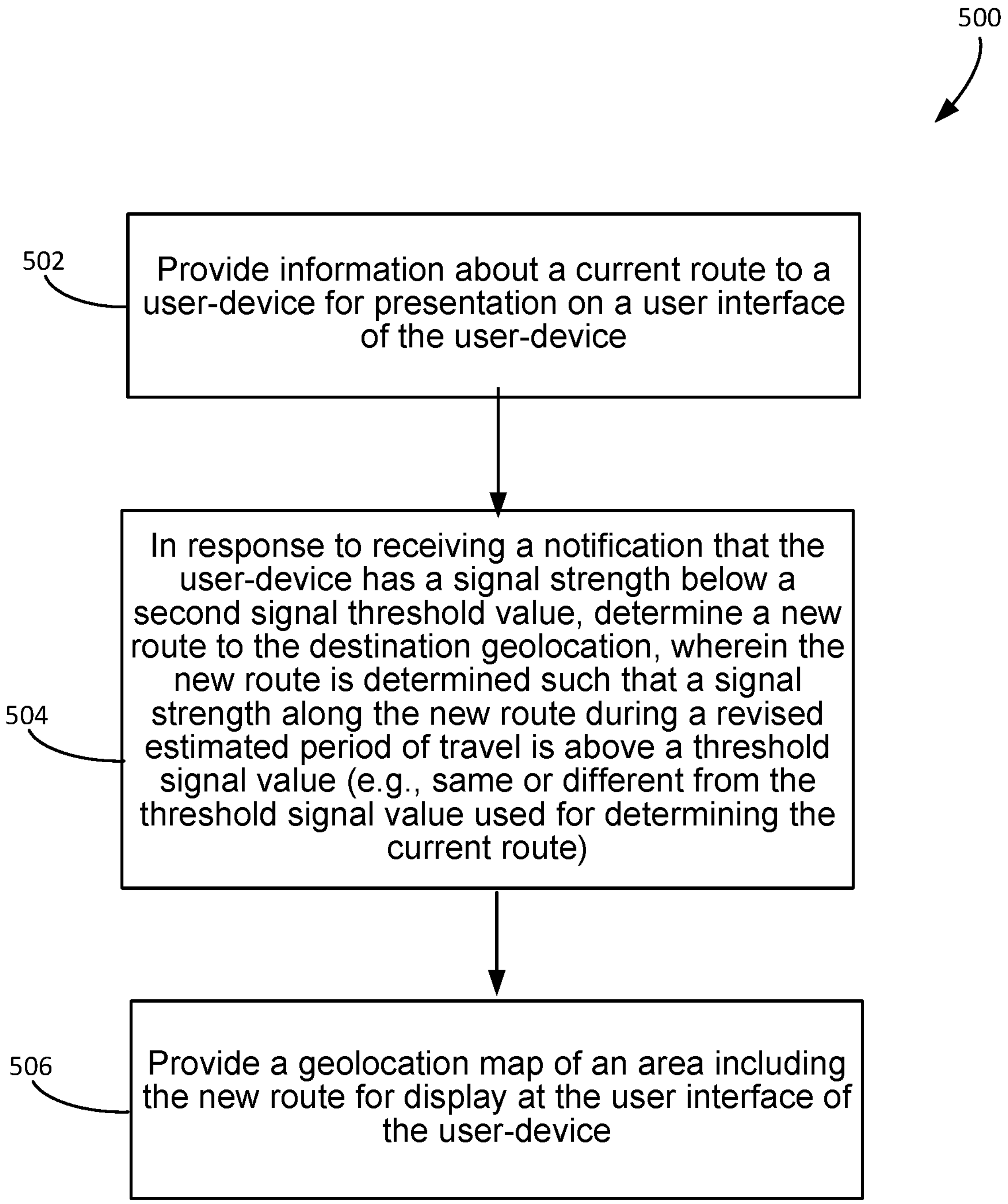
FIG. 5 is a flowchart of an example process for dynamic evaluation of routing to maintain stable network connectivity while traveling between two geolocations.

FIG. 5 is a flowchart of a process 500 for dynamic evaluation of routing to maintain stable network connectivity while traveling between two geolocations. Operations of the process 500 can be executed by a wireless network (e.g., personal-area network, a cellular core network associated with the cellular radio access network that a user-device is attempting to connect to, other).

Operations of the process 500 can include providing information about a current route to a user-device for presentation on a user-interface of the user-device (502).

Operations of the process 500 can further include determining a new route to the destination geolocation in response to receiving a notification that the user-device has a signal strength below a second signal threshold value. The new route can be determined to be a route that is associated with a signal strength, estimated to be provided during a revised estimated period of travel to the destination geolocation, that is above a threshold signal value (e.g., same or different from the first threshold signal value used for determining the current route as discussed in relation to FIG. 3).

In some implementations, the notification can be received to include information that the signal strength is below the second signal threshold value and further it can be determined that the signal strength is expected to fall below the first threshold signal value. In some implementations, the determination that the signal strength is expected to fall below the first threshold signal value can be based on received information about one or more parameters (e.g., corresponding to factors that affect signal strength) likely to affect the signal strength along the current route during the estimated period of travel. In some implementations, the one or more parameters can include parameters associated with factors affecting signal strength and can include one or more: weather condition parameters (e.g., weather changes such as wind speed increase, reduced air quality, precipitation, other), signal status information, and information indicative of obstacles along the route.

In some implementations, the prediction that the signal strength is to fall below the first threshold signal value can be associated with a time period and/or a portion of the route. In some implementations, a re-evaluation of the route can be triggered in response to the determination that the signal strength is expected to decline below a second threshold value (e.g., same or different from the first threshold value) for a portion of the route within the estimated time period for travel. In some implementations, a revised route such that the signal strength remains above the second threshold value along the revised route during the revised period of travel between the current geolocation and the target geolocation according to the revised route can be determined. In such a way, the repositioning between the initial and target geolocations can be continued over the revised route for the rest of the traveling, which can partially overlap with the previous route.

Operations of the process 500 can further include providing a geolocation map of an area including the new route for display at the user-interface of the user-device (504), for example, as discussed in relation to FIGS. 2 and 3.

Figure 6:
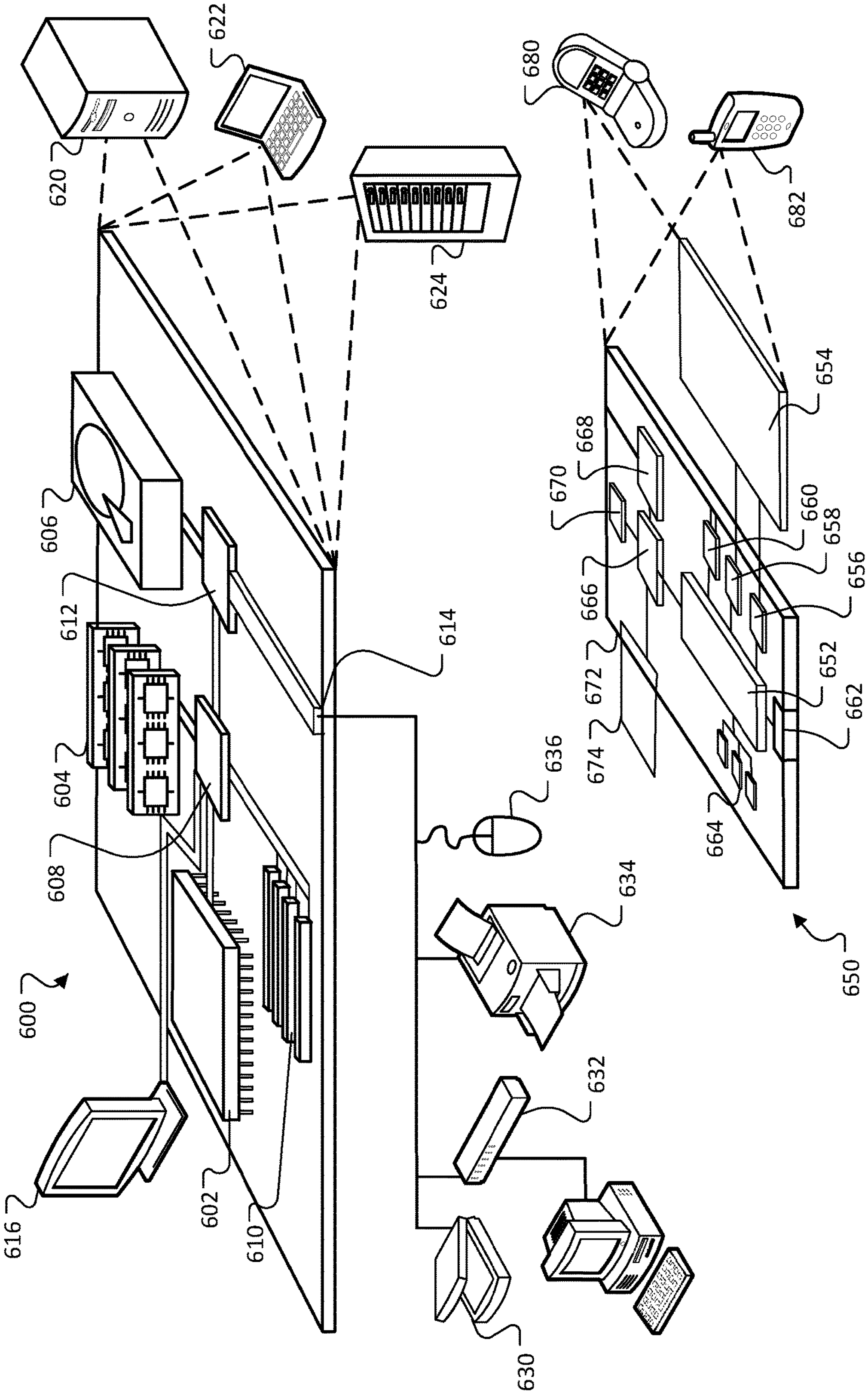
FIG. 6 is a diagram illustrating an example of a computing environment.

FIG. 6 shows an example of a computing device 600 and a mobile computing device 650 that are employed to execute implementations of the present disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 600 and/or the mobile computing device 650 can form at least a portion of the network environments (e.g., environment 100) described above. The computing device 600 and/or the mobile computing device 650 can also form at least a portion of the user-devices (e.g., user-device 144) described above. In some implementations, the network functions and/or network entities described above can be implemented using a cloud infrastructure including multiple computing devices 600 and/or mobile computing devices 650.

The computing device 600 includes a processor 602, a memory 604, a storage device 606, a high-speed interface 608, and a low-speed interface 612. In some implementations, the high-speed interface 608 connects to the memory 604 and multiple high-speed expansion ports 610. In some implementations, the low-speed interface 612 connects to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 and/or on the storage device 606 to display graphical information for a graphical user-interface (GUI) on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of a computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 602, perform one or more methods, such as those described above. The instructions can also be stored by one or more storage devices, such as computer-readable or machine-readable mediums, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 614 through a network adapter. Such network input/output devices may include, for example, a switch or router.

The computing device 600 may be implemented in a number of different forms, as shown in the FIG. 6. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652; a memory 664; an input/output device, such as a display 654; a communication interface 666; and a transceiver 668; among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate. In some implementations, the mobile computing device 650 may include a camera device(s).

The processor 652 can execute instructions within the mobile computing device 650, including instructions stored in the memory 664. The processor 652 may be implemented as a chipset of chips that include separate and multiple analog and digital processors. For example, the processor 652 may be a Complex Instruction Set Computers (CISC) processor, a Reduced Instruction Set Computer (RISC) processor, or a Minimal Instruction Set Computer (MISC) processor. The processor 652 may provide, for example, for coordination of the other components of the mobile computing device 650, such as control of user-interfaces (UIs), applications run by the mobile computing device 650, and/or wireless communication by the mobile computing device 650.

The processor 652 may communicate with a user through a control interface 658 and a display interface 656 coupled to the display 654. The display 654 may be, for example, a Thin-Film-Transistor Liquid Crystal Display (TFT) display, an Organic Light Emitting Diode (OLED) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a Single in Line Memory Module (SIMM) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 652, perform one or more methods, such as those described above. The instructions can also be stored by one or more storage devices, such as one or more computer-readable or machine-readable mediums, such as the memory 664, the expansion memory 674, or memory on the processor 652. In some implementations, the instructions can be received in a propagated signal, such as, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS), IP Multimedia Subsystem (IMS) technologies, and 5G technologies. Such communication may occur, for example, through the transceiver 668 using a radio frequency. In addition, short-range communication, such as using a Bluetooth or Wi-Fi, may occur. In addition, a Global Positioning System (GPS) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in FIG. 6. For example, it may be implemented in the user-device described with respect to FIG. 1. Other implementations may include a phone device 680, a personal digital assistant 682, and a tablet device (not shown). The mobile computing device 650 may also be implemented as a component of a smart-phone, AR device, or other similar mobile device.

The computing device 600 may be implemented in the network environment 100 described above with respect to FIGS. 1-5.

Computing device 600 and/or 650 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

What is claimed is:

1. A computer-implemented method comprising:

receiving user-input requesting a route from a first geolocation to a second geolocation;

accessing, in response to the user-input, a prediction map comprising predicted signal strengths associated with a wireless network at a plurality of geolocations between the first geolocation and the second geolocation, the prediction map accounting for expected weather conditions and predicted signal strengths for an estimated period of travel between a third geolocation and a fourth geolocation located along a path between the first geolocation and the second geolocation; and determining, based on the prediction map, the route from the first geolocation to the second geolocation, wherein the route is determined such that a signal strength along the route during the estimated period of travel between the third geolocation and the fourth geolocation is above a first threshold signal value, wherein the prediction map is generated by executing a prediction model to determine the predicted signal strengths, the prediction model being trained using training data comprising signal strength data corresponding to various geographic locations collected from a plurality of user-devices and corresponding weather conditions.

2. The method of claim 1, further comprising:

providing information about the route to a user-device for presentation on a user-interface of the user-device.

3. The method of claim 1, wherein generating the prediction map comprises:

obtaining data representing the expected weather conditions for the plurality of geolocations between the first geolocation and the second geolocation during an estimated period of travel; and executing the prediction model to determine the predicted signal strengths at the plurality of geolocations at estimated time points determined based on an expected period of travel between the first geolocation and each of the respective geolocations.

4. The method of claim 1, comprising:

receiving information about one or more parameters likely to affect signal strength along the route during the estimated period of travel;

based on the received information, determining that the signal strength is predicted to fall below the first threshold signal value for at least a portion of the route; and in response to the determination, determining a revised route such that the signal strength remains above the first threshold signal value along the revised route during a revised estimated period of travel between the first geolocation and the second geolocation according to the revised route.

5. The method of claim 4, wherein the one or more parameters comprise at least one of: weather condition parameters, signal status information, or information indicative of obstacles along the route.

6. The method of claim 1, comprising:

providing information about the route to a user-device for presentation on a user-interface of the user-device;

in response to receiving a notification that the user-device has a signal strength below a second signal threshold value, determining a new route to the second geolocation, wherein the new route is determined such that a signal strength along the new route during a revised estimated period of travel is above the first threshold signal value; and providing a geolocation map of an area including the new route for display at the user-interface of the user-device.

7. A system comprising:

one or more processors; and one or more computer-readable memories coupled to the one or more processors and having instructions stored thereon that are executable by the one or more processors to perform operations comprising:

receiving user-input requesting a route from a first geolocation to a second geolocation;

accessing, in response to the user-input, a prediction map comprising predicted signal strengths associated with a wireless network at a plurality of geolocations between the first geolocation and the second geolocation, the prediction map accounting for expected weather conditions and predicted signal strengths for an estimated period of travel between a third geolocation and a fourth geolocation located along a path between the first geolocation and the second geolocation; and determining, based on the prediction map, the route from the first geolocation to the second geolocation, wherein the route is determined such that a signal strength along the route during the estimated period of travel between the third geolocation and the fourth geolocation is above a first threshold signal value, wherein the prediction map is generated by executing a prediction model to determine the predicted signal strengths, the prediction model being trained using training data comprising signal strength corresponding to various geographic locations collected from a plurality of user-devices and corresponding weather conditions.

8. The system of claim 7, wherein the computer-readable memories further store instructions that are executable by the one or more processors to perform operations comprising:

providing information about the route to a user-device for presentation on a user-interface of the user-device.

9. The system of claim 7, wherein generating the prediction map comprises:

obtaining data representing the expected weather conditions for the plurality of geolocations between the first geolocation and the second geolocation during an estimated period of travel; and executing the prediction model to determine the predicted signal strengths at the plurality of geolocations at estimated time points determined based on an expected period of travel between the first geolocation and each of the respective geolocations.

10. The system of claim 7, wherein the computer-readable memories further store instructions that are executable by the one or more processors to perform operations comprising:

receiving information about one or more parameters likely to affect signal strength along the route during the estimated period of travel;

based on the received information, determining that the signal strength is predicted to fall below the first threshold signal value for at least a portion of the route; and in response to the determination, determining a revised route such that the signal strength remains above the first threshold signal value along the revised route during a revised estimated period of travel between the first geolocation and the second geolocation according to the revised route.

11. The system of claim 10, wherein the one or more parameters comprise at least one of: weather condition parameters, signal status information, or information indicative of obstacles along the route.

12. A non-transitory computer-readable medium storing instructions that are executable by a processing device, and upon such execution cause the processing device to perform operations comprising:

receiving user-input requesting a route from a first geolocation to a second geolocation;

accessing, in response to the user-input, a prediction map comprising predicted signal strengths associated with a wireless network at a plurality of geolocations between the first geolocation and the second geolocation, the prediction map accounting for expected weather conditions and predicted signal strengths for an estimated period of travel between a third geolocation and a fourth geolocation located along a path between the first geolocation and the second geolocation; and determining, based on the prediction map, the route from the first geolocation to the second geolocation, wherein the route is determined such that a signal strength along the route during the estimated period of travel between the third geolocation and the fourth geolocation is above a first threshold signal value, wherein the prediction map is generated by executing a prediction model to determine the predicted signal strengths, the prediction model being trained using training data comprising signal strength data corresponding to various geographic locations collected from a plurality of user-devices and corresponding weather conditions.

13. The non-transitory computer-readable medium of claim 12, wherein the operations further comprise:

providing information about the route to a user-device for presentation on a user-interface of the user-device.

14. The non-transitory computer-readable medium of claim 12, wherein generating the prediction map comprises:

obtaining data representing the expected weather conditions for the plurality of geolocations between the first geolocation and the second geolocation during an estimated period of travel; and executing the prediction model to determine the predicted signal strengths at the plurality of geolocations at estimated time points determined based on an expected period of travel between the first geolocation and each of the respective geolocations.

15. The non-transitory computer-readable medium of claim 12, wherein the operations further comprise:

receiving information about one or more parameters likely to affect signal strength along the route during the estimated period of travel;

based on the received information, determining that the signal strength is predicted to fall below the first threshold signal value for at least a portion of the route; and in response to the determination, determining a revised route such that the signal strength remains above the first threshold signal value along the revised route during a revised estimated period of travel between the first geolocation and the second geolocation according to the revised route.

16. The non-transitory computer-readable medium of claim 15, wherein the one or more parameters comprise at least one of: weather condition parameters, signal status information, or information indicative of obstacles along the route.

17. The non-transitory computer-readable medium of claim 12, wherein the operations further comprise:

providing information about the route to a user-device for presentation on a user-interface of the user-device;

in response to receiving a notification that the user-device has a signal strength below a second signal threshold value, determining a new route to the second geolocation, wherein the new route is determined such that a signal strength along the new route during a revised estimated period of travel is above the first threshold signal value; and providing a geolocation map of an area including the new route for display at the user-interface of the user-device.

18. The method of claim 1, wherein the training data comprises (i) signal indicators including received signal strength indicator (RSSI), channel state information (CSI) collected from a plurality of user devices with respective geolocations, (ii) the corresponding weather conditions, and (iii) device movement patterns tracked over time as the plurality of user devices reposition between geolocations within a network coverage area, the training data being collected by crowdsourcing over a time period.

19. The system of claim 7, wherein the training data comprises (i) signal indicators including received signal strength indicator (RSSI), channel state information (CSI) collected from a plurality of user devices with respective geolocations, (ii) the corresponding weather conditions, and (iii) device movement patterns tracked over time as the plurality of user devices reposition between geolocations within a network coverage area, the training data being collected by crowdsourcing over a time period.

20. The non-transitory computer-readable medium of claim 12, wherein the training data comprises (i) signal indicators including received signal strength indicator (RSSI), channel state information (CSI) collected from a plurality of user devices with respective geolocations, (ii) the corresponding weather conditions, and (iii) device movement patterns tracked over time as the plurality of user devices reposition between geolocations within a network coverage area, the training data being collected by crowdsourcing over a time period.

* * * * *